July 23, 1963     E. S. JOLINE     3,098,356
FUEL CONTROL SYSTEM FOR GAS TURBINE ENGINES
Filed Oct. 20, 1960     4 Sheets-Sheet 1

INVENTOR
EVERETT S. JOLINE
BY
ATTORNEY

July 23, 1963                E. S. JOLINE                3,098,356
             FUEL CONTROL SYSTEM FOR GAS TURBINE ENGINES
Filed Oct. 20, 1960                                 4 Sheets-Sheet 2
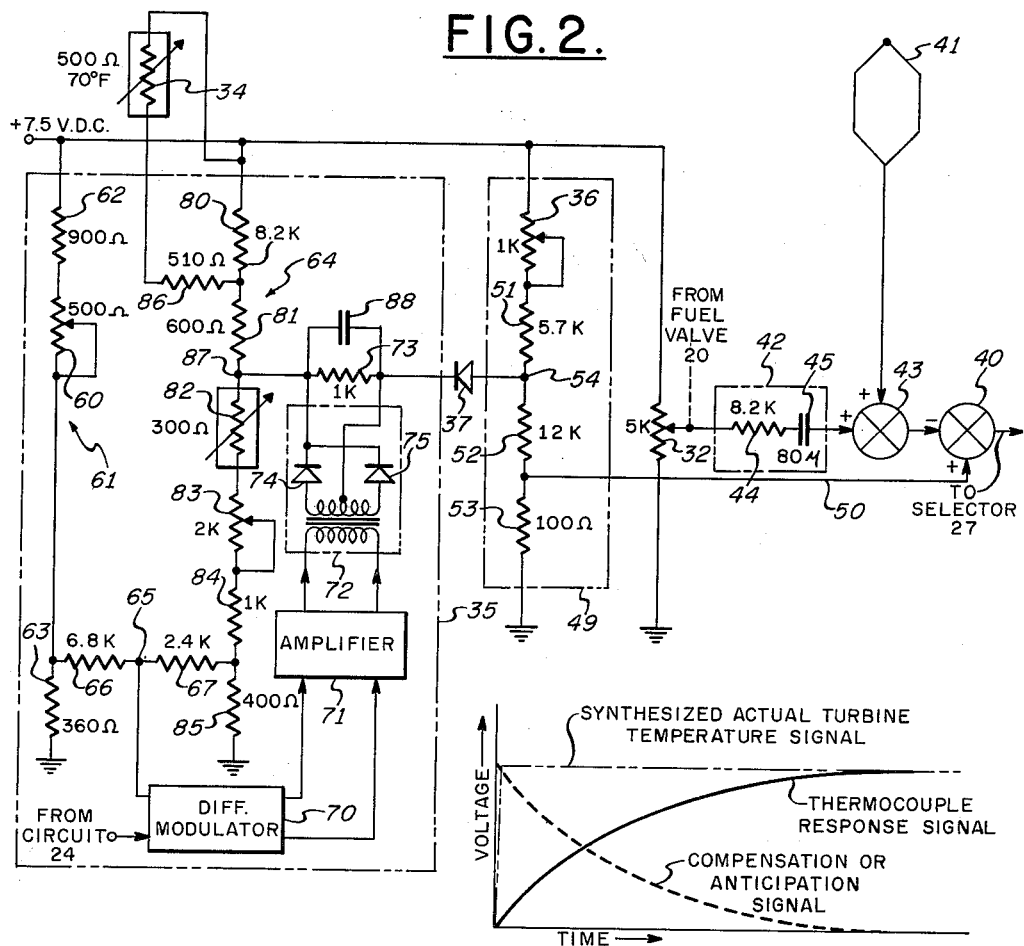
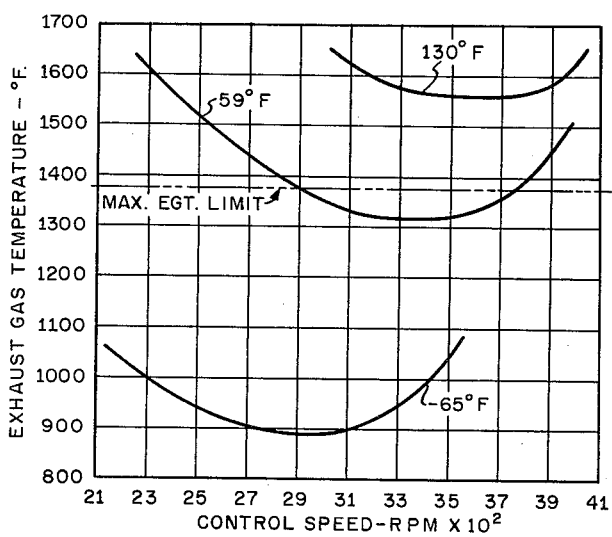
INVENTOR
EVERETT S. JOLINE
BY
ATTORNEY July 23, 1963     E. S. JOLINE     3,098,356
FUEL CONTROL SYSTEM FOR GAS TURBINE ENGINES
Filed Oct. 20, 1960     4 Sheets-Sheet 3
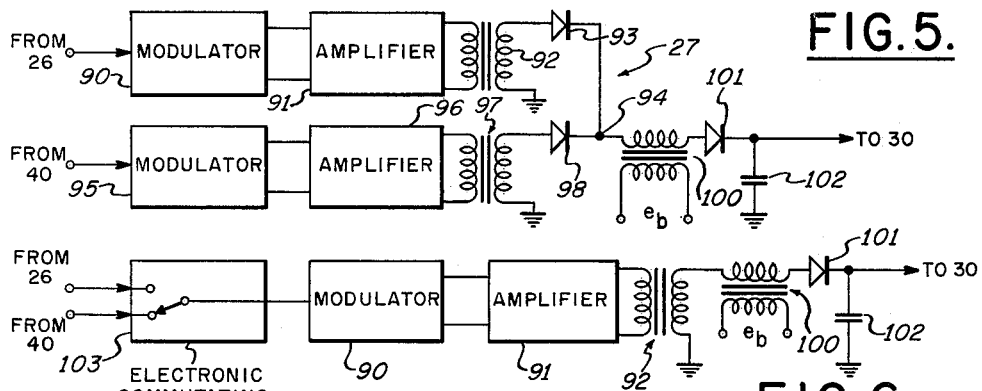
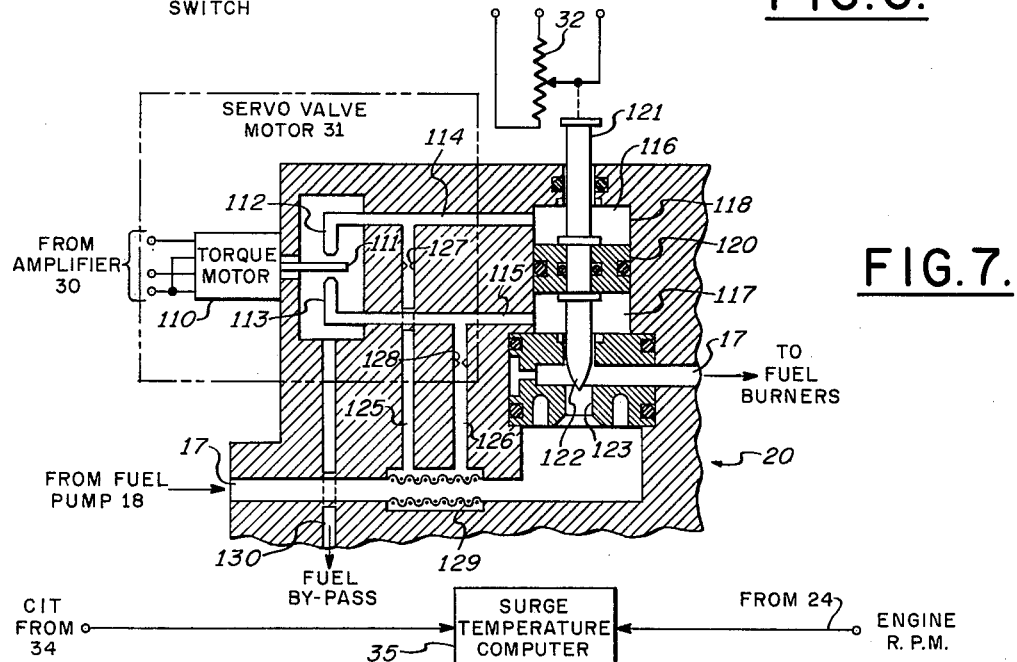
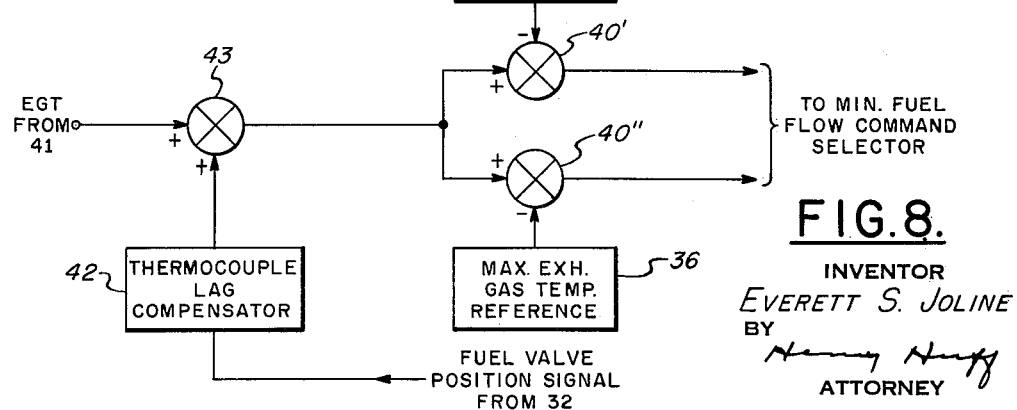
INVENTOR
EVERETT S. JOLINE
BY
ATTORNEY

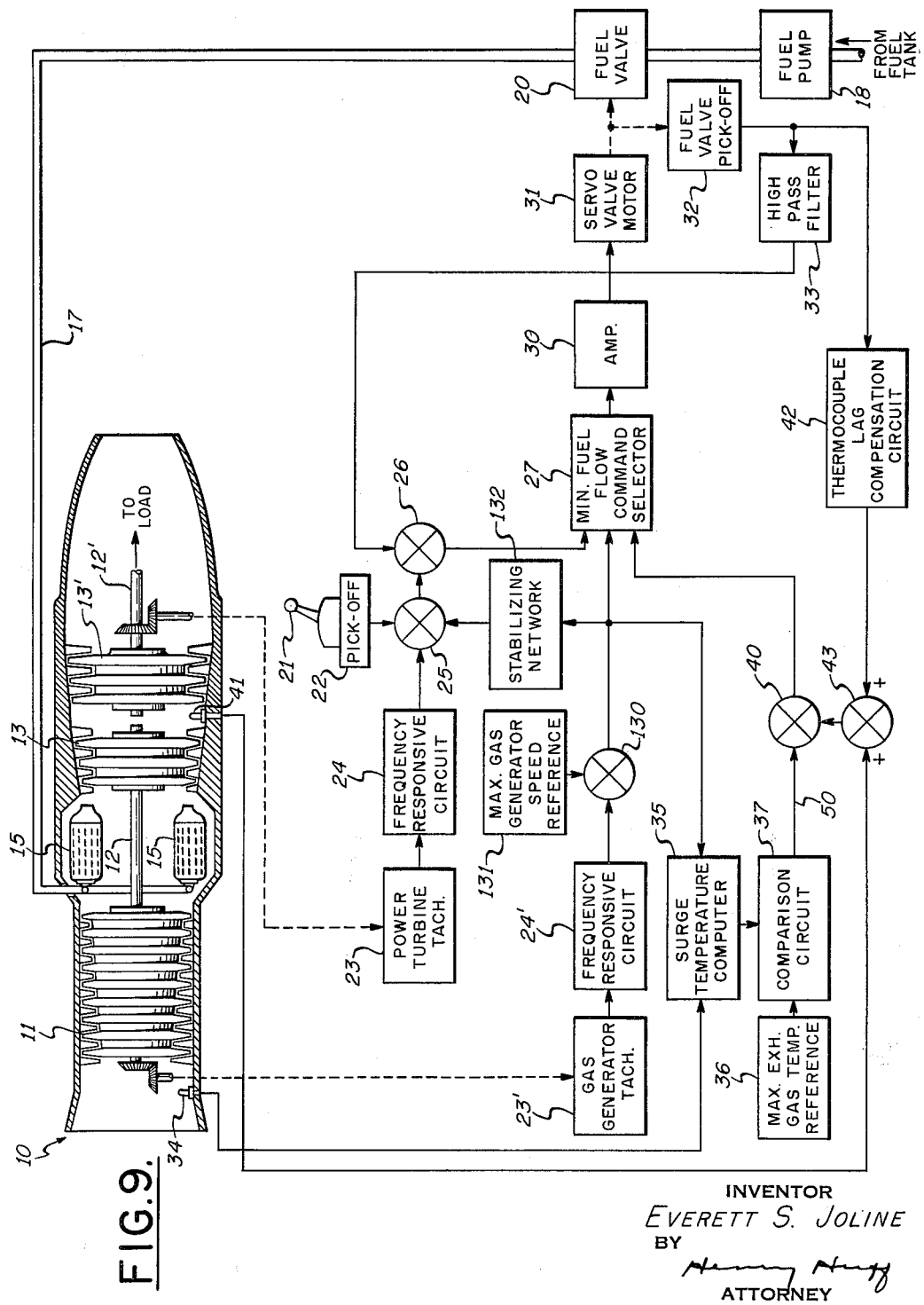

United States Patent Office 3,098,356
Patented July 23, 1963

3,098,356
FUEL CONTROL SYSTEM FOR GAS
TURBINE ENGINES
Everett S. Joline, Huntington Station, N.Y., assignor to Sperry Rand Corporation, Great Neck, N.Y., a corporation of Delaware
Filed Oct. 20, 1960, Ser. No. 63,946
3 Claims. (Cl. 60—39.28)

This invention relates to the control of fuel flow to gas turbine engines to provide the desired safe steady state power level with provision for safe acceleration and deceleration of the engine when changing the desired power level.

The invention is applicable to single and two spool turbojet, and turbo-shaft engines of the single spool and free turbine variety.

The present invention provides an extremely versatile and compact fuel control system utilizing electronics for the computation functions in lieu of the conventional hydromechanical computers presently used. The use of electronic computation also enables the use of different parameters than those adaptable for hydromechanical type controls. For example, turbine temperature in the form of exhaust gas temperature or turbine outlet temperature may be utilized instead of compressor outlet pressure as the compressor surge limiting and turbine temperature limiting parameter. Through the use of a signal representative of the turbine temperature, the measurement and open-loop scheduling and limiting of the fuel flow is avoided. Further, errors inherent in prior art systems due to variations in fuel heating value, combustion efficiency and fuel density are avoided. Since gas turbine engines for aircraft are normally required to operate under an extreme range of fuel flows, the fuel metering means is required to have both high accuracy and wide flow range, the latter making the attainment of high accuracy extremely difficult. In contract, the present invention due to the nature of the turbine temperature signal used and the electronic computations performed therewith provides a substantially constant high relative accuracy under all conditions.

Conventional hydromechanical controls suffer from three further disadvantages. (1) The mating parts of the hydromechanical fuel control device are manufactured with extremely close tolerances thus making them susceptible to malfunction when used with normally heavily contaminated fuels. (2) The hydromechanical fuel control system is particularly cumbersome when utilized with a small or medium sized jet engine and it is difficult to scale down the hydromechanical apparatus since the force levels are thereby reduced making the apparatus still more susceptible to various types of malfunction. (3) The hydromechanical control is dependent upon the use of three-dimensional cams. Three-dimensional cams are extremely difficult and expensive to manufacture and are designed for a particular engine operating under a particular limited range of operating conditions. Adapting the hydromechanical control to another set of operating conditions and/or another engine requires a complete redesign of the cam as well as a substantial portion of the control system.

The present invention on the other hand provides a compact control apparatus having relatively simple hydromechanical parts which are appreciably less subject to malfunction due to fuel contamination. The present invention is extremely versatile and by simple adjustments the circuitry can be adapted to a wide range of operation and/or a variety of engines without redesign.

It is a primary object of the present invention to provide a fuel control system for gas turbine engines permitting safe accurate control of the engine over a wide range of operating conditions with a minimum of complex apparatus.

It is an additional object of the present invention to provide a fuel control system for gas turbine engines in which the turbine temperature signal is based upon actual rather than predicted conditions.

It is a further object of the present invention to provide a fuel control system for gas turbine engines which controls the fuel flow in accordance with the control signal commanding the least fuel flow.

These and other objects of the present invention are achieved by providing an electronic fuel control system for a gas turbine engine which measures the engine speed and the compressor inlet temperature and from these measures computes a signal representative of the values of the turbine temperature corresponding to compressor surge at the particular operating condition. In a preferred embodiment of the present invention this computed surge temperature is compared with an adjustable maximum turbine temperature reference signal. The lesser of these two signals is then compared with the actual value of the turbine temperature to produce an error signal indicating the imminence of surge or overtemperature. To compensate for the inherent lag in the turbine temperature signal sensor, a signal representative of the rate of change of fuel flow obtained from a fuel valve position sensor is summed with the turbine temperature signal to provide a signal representative of the actual turbine temperature. The position of the power lever provides a signal representative of the desired engine speed which is compared with a signal representative of the actual engine speed to produce an error signal in accordance with the difference therebetween. A selector circuit selects the error signal demanding the least fuel flow and passes it to an amplifier which drives a torque motor to control a flapper valve that actuates the fuel flow control valve. The various reference signal providing means are readily adjustable to provide for varying the parameters of the control system to adapt it to various types of jet engines and operating conditions.

Other objects and advantages of the present invention will become apparent upon a study of the following disclosure when considered in connection with the accompanying drawings, wherein:

FIG. 2 is a detailed wiring schematic diagram of a portion of the control system of FIG. 1;

FIG. 3 is a graph indicating how the synthesized actual turbine temperature signal is derived;

FIG. 4 is a graph of exhaust gas temperature versus control speed showing the compressor surge limiting curves plotted for —65° F., 59° F. and 130° F. and a typical maximum exhaust gas temperature limit;

FIG. 5 is a schematic wiring diagram of the minimum fuel flow command selector 27 of FIG. 1;

FIG. 6 is an alternative embodiment of the selector of FIG. 5;

FIG. 7 is a schematic partially in cross section of the servo valve motor 31 and the fuel flow control valve 20;

FIG. 8 is a schematic block diagram of an alternative embodiment of a portion of the control system of FIG. 1; and FIG. 9 is a cross sectional schematic of a gas turbine engine having a gas generator and a power turbine including a block diagram of another embodiment of the present invention applied thereto.

Figure 1:
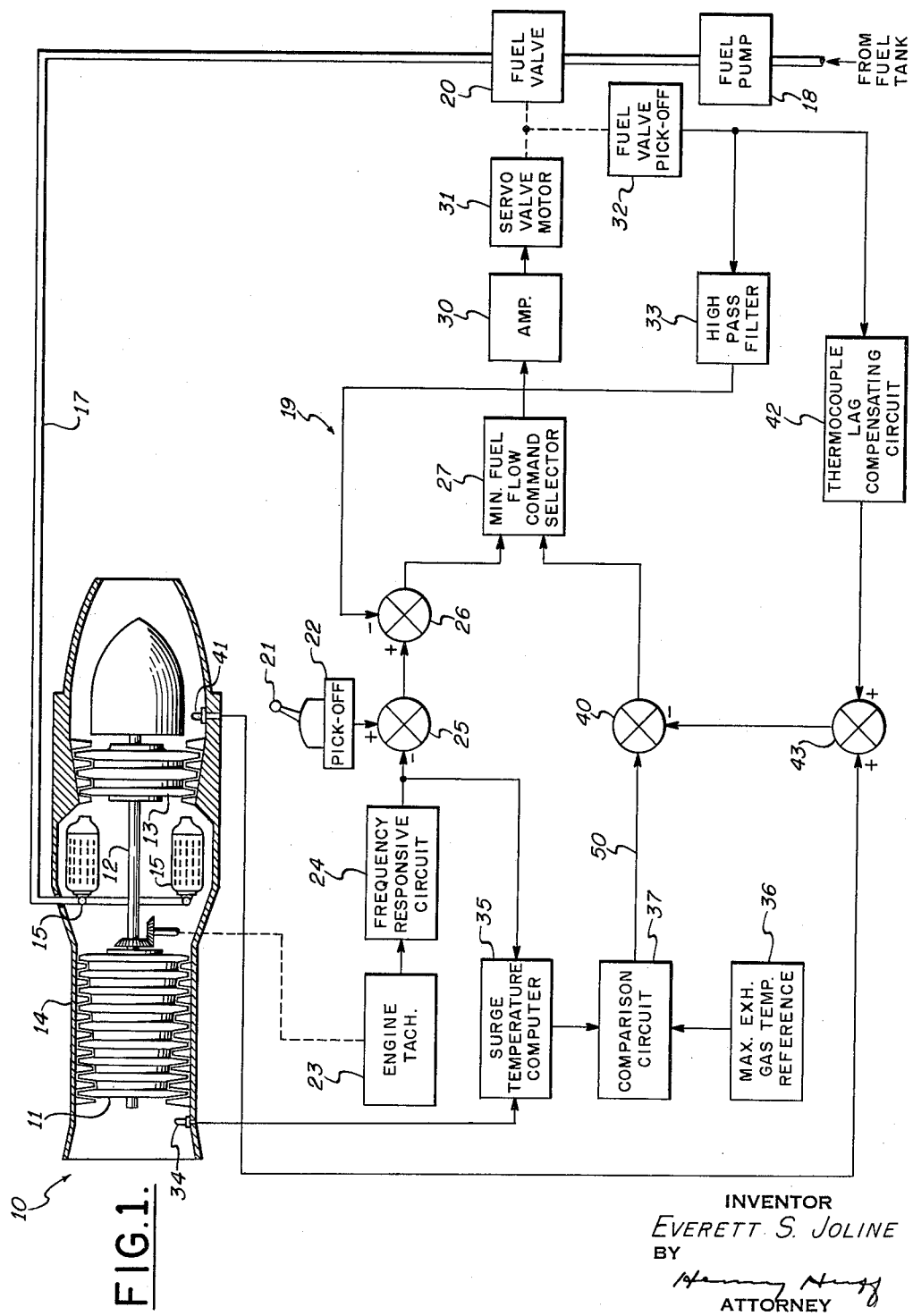
FIG. 1 is a cross sectional schematic of a gas turbine engine including a block diagram of a preferred embodiment of the fuel control system of the present invention.

The fuel control system of the present invention is intended for use in connection with gas turbine power plants, airborne or stationary. For purposes of simplicity the invention will be described as applied to engines in which fuel flow is the only independent variable. However, the control system is equally applicable, in combination with other controls, to control engines having additional variables such as variable inlet areas and variable exhaust nozzle areas. The control system is also applicable to engines having compressor bleeds and variable compressor geometry providing the temperature schedule is appropriately compensated for changes in these variables. A preferred embodiment of the invention is shown in FIG. 1 for purposes of example as applied to a jet aircraft engine 10. The engine 10 has a compressor 11 connected by a shaft 12 to a turbine 13; the compressor-turbine combination being rotatably mounted by bearings, not shown, within the housing 14 of the engine 10 in a conventional manner. A plurality of fuel burners 15 are disposed around the inner periphery of the housing 14 between the compressor 11 and the turbine 13. Fuel is provided to the fuel burners 15 through a conduit 17 from a fuel tank, not shown, by means of a fuel pump 18. The amount of fuel supplied to the burners 15 is controlled by means of a fuel flow control valve 20 connected between the fuel pump 18 and the burners 15. The control valve 20 is actuated by means of a fuel flow control system 19 to be described.

For normal steady state operation, the engine speed is controlled as a function of the power level setting of a manually operable power lever 21. The position of the power lever 21 is measured by a pick-off 22 which provides a D.C. signal having a magnitude representative of the desired engine speed.

To provide a signal representative of the actual engine speed, a tachometer generator 23 is connected to be responsive to the rotation of the shaft 12. The tachometer generator 23 is connected to a frequency responsive circuit 24 which converts the tachometer generator signal to a D.C. signal having a magnitude representative of the engine speed. The circuit 24 may be of the type disclosed in Serial No. 732,639, filed May 2, 1958, entitled "Speed Responsive System," invented by H. D. Smith. The actual engine speed signal from the circuit 24 is compared with the desired engine speed signal from the pick-off 22 in an algebraic summation device 25 which provides an error signal in accordance with the difference therebetween. The error signal is applied through an algebraic summation device 26 to a minimum fuel flow command selector means 27. Means 27 is in turn connected to an amplifier 30 which controls the operation of a servomotor 31 that actuates the fuel flow control valve 20.

The position of the fuel flow control valve 20 is detected by a fuel valve pick-off device 32. The pick-off 32 provides through a high pass filter 33 a feedback signal having phase lead characteristics to an input terminal of the summation device 26 in opposition to the signal from the summation device 25. By this arrangement proportional plus integral control is obtained through the engine speed servo loop described immediately above.

The present invention also serves to limit the operation of the engine 10 when necessary to prevent compressor surge and to prevent excessive temperature of the turbine blades. A thermistor 34 is mounted in the compressor inlet and provides a signal representative of the compressor inlet temperature. A compressor surge temperature computer 35 which will be more fully explained with respect to FIG. 2 is connected to the thermistor 34 and to the frequency responsive circuit 24. The surge temperature computer 35 is thus responsive to signals representative of the compressor inlet temperature and the actual engine speed for generating a D.C. signal representative of the values of turbine discharge temperature corresponding to surge at the particular operating condition. A maximum exhaust gas temperature reference signal providing means 36 provides a D.C. signal having a magnitude representative of the maximum exhaust gas temperature, i.e., the turbine temperature, which is compared in a comparison circuit 37 with the computed surge temperature signal. By means of this comparison, the signal having the lesser magnitude is connected by means of a lead 50 to an input terminal of an algebraic summation device 40 in a manner that will be more fully explained with respect to FIG. 2.

A thermocouple 41 is mounted in the engine 10 on the discharge side of the turbine 13, and provides a D.C. signal representative of the exhaust gas or turbine discharge temperature. The temperature signal from the thermocouple 41 inherently lags the actual temperature signal during transient conditions due to the imperfect response of the thermocouple 41. In order to compensate for this lag, a thermocouple lag compensation circuit 42 which will be more fully explained with respect to FIG. 2 is connected to the fuel valve pick-off 32. The circuit 42 for example, may be a high pass filter circuit which effectively provides a lagged rate of change of fuel flow signal that is summed with the exhaust gas temperature signal in a summation network 43 to provide a signal representative of the actual exhaust gas temperature. The actual exhaust gas temperature signal is applied to an input terminal of the summation device 40 where it is compared with the signal from the circuit 37 appearing on the other input terminal of the device 40. The difference therebetween is an error signal which is applied to the minimum fuel flow command selector 27. The error signal which demands the least fuel flow is selected in the selector 27 and passed to the amplifier 30 where it is amplified to drive the servomotor 31 and thus actuate the fuel flow control valve 20 thereby controlling the flow of fuel through the conduit 17 to the burners 15 in a manner to be explained in detail with respect to FIGS. 2, 5 and 7.

By means of the above described fuel flow control system, the power level of the engine 10 is determined by the setting of power lever 21 as a function of the engine speed while the engine 10 is prevented from entering the compressor surge temperature region or exceeding the maximum permissible exhaust gas temperature. The response of the control system is extremely accurate by virtue of the thermocouple lag compensation means and due to electronic computation methods, it provides high accuracy over a wide range of operating conditions.

The compressor surge temperature and exhaust gas temperature limiting circuits as well as the thermocouple lag compensation circuit will now be described in detail with respect to FIG. 2. The turbine discharge temperature is sensed by a plurality of thermocouples 41 connected effectively, in parallel. The thermocouples 41 are provided with cold junction temperature compensation in a conventional manner not shown. The response of the thermocouples 41 lags the actual temperature condition in accordance with a predetermined time delay that can be approximated as a first order lag. A typical response of the thermocouple 41 to a step function input signal representative of an abrupt temperature change is shown as a solid line in FIG. 3.

In order to compensate for this lag in the exhaust gas temperature signal, an anticipation signal is computed and added to the sensed exhaust gas temperature signal at the junction 43 in the circuit. With the fuel valve 20, shown in FIG. 1, contoured in such a way that the log of the fuel flow is proportional to the stroke of the valve, the anticipation signal is derived from the fuel valve pick-off 32 by means of a high pass filter circuit 42. The compensation or anticipation signal as shown in dotted lines in FIG. 3 is shaped by the high pass filter circuit 42 in order that the sum of the two signals reproduces the actual step in temperature that would occur as a result of the step change in fuel valve position and thus provides a synthesized signal shown in dot-dash lines in FIG. 3 which is representative of the actual exhaust gas temperature.

With the fuel valve contoured in order that the log of the fuel flow is proportional to the stroke, the perturbation voltage produced by the signal change in the fuel valve position is proportional to the percent change of fuel flow. Since the air flow through the engine 10, shown in FIG. 1, can be considered to remain constant for short term effects, this voltage also represents a given percent change in the fuel-air ratio which produces a predictable change in temperature. With the wiper of the pick-off 32 connected to be responsive to the position and movement of the fuel valve 20 and with the log of fuel flow proportional to the valve stroke, the pick-off 32 is responsive to the log of the fuel flow which in turn represents a predictable temperature change. The value of the resistor 44 of the filter 42 is selected to approximate this effect for temperature compensation while the capacitor 45 is selected to match the time constant of the thermocouple 41 to produce high fidelity compensation.

The actual exhaust gas temperature signal is compared in the algebraic summation device 40 with a reference signal appearing on the lead 50. As explained above with respect to FIG. 1, the reference signal appearing on the lead 50 is representative of the maximum exhaust gas temperature or the compressor surge temperature whichever is the lower. The maximum exhaust gas temperature is a fixed value for a particular gas turbine engine and a signal representative thereof is generated by adjusting the maximum exhaust gas temperature reference potentiometer 36. A typical value of maximum exhaust gas temperature may be 1375° F. as shown in FIG. 4. The potentiometer 36 forms a portion of a voltage dividing network 49 which further includes the resistors 51, 52 and 53 connected in series. One extremity of the lead 50 is connected to the junction of the resistors 52 and 53.

The compressor surge temperature limiting curves vary with both compressor inlet temperature and engine speed. They are plotted in FIG. 4 for three values of inlet air temperature —65° F., 59° F. and 130° F. The circuit of FIG. 2 compares the two voltages representative of the maximum exhaust gas temperature and the compressor surge temperature across a rectifier 37 in order that the lower of the two voltages appears across the resistor 53 on the lead 50 as the reference temperature limit signal. The maximum exhaust gas temperature signal appears on the right side of the rectifier 37 while the compressor surge temperature signal is computed in the surge temperature computer 35 in a manner to be explained and appears on the left side of the rectifier 37. The rectifier 37 is connected between the junction 54 of the resistors 51 and 52 of the voltage dividing network 49 and the surge temperature computer 35. The rectifier 37 is poled in a direction to conduct current from the voltage divider 49 to the surge temperature computer 35 when the voltage on the left or computer side of the rectifier 37 has a lower magnitude than that on the right or voltage dividing circuit side. Thus, the potential at the junction 54 never exceeds that established by the maximum exhaust gas temperature potentiometer 36.

The surge temperature computer 35 is designed to reproduce the surge curves shown in FIG. 4 which vary as a function of the compressor inlet temperature and the engine speed. The surge curve is approximated in the surge computer 35 by three segments which form the shape of a U or rounded off V. The signal representative of the nominal minimum value of the surge temperature schedule is generated in a surge center potentiometer 60. The potentiometer 60 is a portion of a voltage dividing network 61 which further includes the resistors 62 and 63 connected in series. The minimum value of the surge temperature curve varies with compressor inlet temperature. In order to modify the signal from the potentiometer 60 in accordance with compressor inlet temperature, a portion of the signal from the thermistor 34 is provided through a voltage dividing network 64 and added to the surge center speed signal at the junction 65 of mixing resistors 66 and 67. The potential appearing at the junction 65 is representative of the corrected surge center signal.

The junction 65 is connected to one inlet terminal of a differential modulator 70 which has its other inlet terminal connected to receive the actual engine speed signal from the frequency responsive circuit 24 shown in FIG. 1. The surge center signal and the actual engine speed signal are compared in the differential modulator 70. The signal representing the difference therebetween is modulated in the modulator 70, then amplified in an amplifier 71 and rectified in a full wave rectifier 72 to produce a voltage proportional to the absolute value of this across a resistor 73 that is connected to the output terminals of the rectifier 72. This absolute potential produces a V shape when plotted against engine speed. The forward voltage standoff of the silicon rectifiers 74 and 75 of the full wave rectifier 72 produces the desired rounded-off effect at the minimum value of the V.

The voltage dividing network 64 includes resistors 80 and 81, sensistor 82, circuit adjusting potentiometer 83 and resistors 84 and 85, all of which are connected in series. The thermistor 34 is connected in series with a resistor 86 both of which are connected in parallel with respect to the resistor 80. One extremity of the resistor 73 is connected to the junction 87 of the resistor 81 and the sensistor 82 of the voltage dividing network 64. The other extremity of the resistor 73 is connected to the rectifier 37. A condenser 88 is connected in shunt across the resistor 73 for purposes of smoothing the full wave rectified voltage appearing across this resistor. The sensistor 82 compensates the circuit for variations in the forward voltage drop of the silicon rectifier 37.

The voltage generated across the resistor 73 by means of the full wave rectifier 72 is added at the junction 87 to the voltage generated by the thermistor 34 thereby raising and lowering the position of the V as a function of the compressor inlet temperature sensed by the thermistor 34. As the resistance of the thermistor 34 varies, the voltage divider action of the network 64 produces a required reference voltage at the junction 87 thereby producing a potential on the surge computer side of the rectifier 37.

When the potential so generated on the left or surge computer side of the rectifier 37 is greater than the potential on the right or voltage dividing side of the rectifier 37, the rectifier 37 will not conduct and the reference voltage appearing on the lead 50 will be representative of the maximum exhaust gas temperature signal generated by the potentiometer 36. However, when the potential appearing on the left side of rectifier 37 is less than that appearing on the right side thereof, the rectifier 37 conducts and the potential then appearing at the junction 54 will be representative of the compressor surge temperature and this signal will appear as the reference signal on the lead 50. The difference between the actual exhaust gas temperature signal and the reference signal appearing on the lead 50 is compared in the algebraic summation device 40 and the difference therebetween is an error signal which is applied to the minimum fuel flow command selector 27 shown in FIG. 1.

As described previously, the minimum fuel flow command selector 27 is also responsive to an error signal from the device 26 and selects the error signal demanding the least fuel flow and passes it as a control signal to the amplifier 30. This may be accomplished by either of the circuits shown in FIGS. 5 or 6.

Referring to FIG. 5, the error signal from the device 26 is applied to a modulator 90 which is connected through an amplifier 91, an isolation tranformer 92 and a rectifier 93 to a junction 94. Similarly, the error signal from the device 40 is connected to a modulator 95, an amplifier 96, an isolation transformer 97, a rectifier 98 and thence to the junction 94. The junction 94 is connected through the secondary of a biasing transformer 100 and a rectifier 101 to the amplifier 30 shown in FIG. 1. The input terminal of the amplifier 30 is connected through a condenser 102 to ground.

Each of the error voltages are modulated by a common carrier frequency by their respective modulators 90 and 95. As each of the error signals varies above and below their respective zero values, the amount of the error is indicated by the amplitude of the signal from their respective modulators and the direction of each of the errors by a 180° phase reversal of the respective signals. A bias voltage $e_b$ at the carrier frequency is connected to the primary of the transformer 100 to suppress one phase of the error signals leaving only the phase that has a positive polarity for a decreased fuel command signal. The most positive of the error signals is then selected by the action of the rectifiers to produce the required control signal.

In FIG. 6 a single modulator 90 and an associated amplifier 91 are time shared by means of an electronic commutating switch 103. The aforementioned two error signals are sequentially applied to the modulator 90 and by the action of the rectifier 101, the most positive signal is selected and applied as a control signal to the amplifier 30 shown in FIG. 1. In the circuit of FIG. 6, the discharge time of the condenser 102 is sufficiently greater than the switching time of the commutating switch 103 to provide a substantially constant control voltage.

As shown in FIG. 1, the control signal to the amplifier 30 is amplified and applied to the servo valve motor 31 which in turn actuates the fuel valve 20. The details of the servo valve motor 31 and the fuel valve 20 can be seen more clearly in FIG. 7 which shows the control signal from the amplifier 30 connected to drive a torque motor 110 which in turn vertically positions a flapper 111. The torque motor 110 and the flapper 111 form a portion of the servo valve motor 31. The flapper 111 is cooperative with spaced nozzles 112 and 113 respectively. The nozzles 112 and 113 communicate by means of conduits 114 and 115 with the upper and lower chambers 116 and 117 respectively of a cylinder 118. A piston 120 is positionably disposed for vertical movement within the cylinder 118 intermediate the chambers 116 and 117.

A piston rod 121 is connected to the piston 120 and its upper extremity extends through the chamber 116 and exteriorly of the cylinder 118 in order to connect to the wiper arm of the fuel valve pick-off potentiometer 32. The resistive portion of the potentiometer 32 is fixed in order that the potentiometer 32 provides a signal having a magnitude and polarity representative of the amount and direction of the position of the piston rod 121. The lower extremity of the piston rod 121 extends through the chamber 117 and exteriorly of the cylinder 118 and has a pointed tip 122. The tip 122 is contoured to cooperate with a fuel flow orifice 123 in order that the log of the fuel flow is proportional to its stroke. Fuel is delivered through the conduit 117 from the fuel pump 118, shown in FIG. 1, to the orifice 123. The amount of fuel provided to the fuel burners 15 shown in FIG. 1 is dependent upon the position of the tip 122 with respect to the orifice 123, i.e., the position of the piston rod 121. The fuel valve 20 is provided with a conventional fuel by-pass not shown so that approximately a constant pressure drop is maintained across the orifice 123.

Fuel under pressure is also provided to the nozzles 112 and 113 by means of conduits 125 and 126 through pressure reducing orifices 127 and 128 respectively. The conduits 125 and 126 communicate with the conduit through a filter 129. Low pressure fluid is returned from the nozzles 112 and 113 to the fuel by-pass not shown by means of a conduit 130.

Referring now to FIGS. 1, 2, 5 and 7 the operation of the preferred embodiment of the invention will now be described. Assuming the pilot wishes to increase engine power, he moves the power lever 21 in a direction to provide a signal representative of increased engine speed. This signal is compared in device 25 with the actual engine speed signal from the tachometer 23. The difference therebetween is an error signal which is applied through the device 26 to the minimum fuel command selector 27. Assuming that the compressor surge temperature and the maximum exhaust gas temperature are below their limiting values, the error signal from the device 40 which is the difference between the actual exhaust gas temperature signal and the lower of the other two signals will not command a limiting action. In this event the error signal from the device 26 will be passed by the selector 27 and the signals act as a control signal in the amplifier 30 to energize the torque motor 110 of the servo valve 31. The flapper 111 will be driven in a downward direction thereby reducing the flow through the nozzle 113 and increasing the pressure in the conduit 115 and in the chamber 117. Simultaneously the flow from the nozzle 112 is less restricted thereby reducing the pressure in the conduit 114 and in the chamber 116. The increased pressure in the chamber 117 and the decreased pressure in the chamber 118 acting upon the piston 120 causes it to be driven upward as viewed in FIG. 7 thereby increasing the opening through the orifice 123 permitting more fuel to flow to the fuel burners 15 until, in the absence of other limiting factors, the actual engine speed equals the desired engine speed.

In the event that the engine approaches the compressor surge temperature or the maximum exhaust gas temperature, whichever is controlling will be compared with the actual exhaust gas temperature signal in the device 40 and the difference will be applied through the selector 27, the amplifier 30 and the servo valve motor 31 to limit the movement of the piston rod 121 in order to limit the amount of fuel delivered to the engine 10. In this way, the engine 10 is controlled in accordance with the movement of the power lever 21 by the pilot while it is simultaneously maintained within safe operating conditions by means of the automatic compressor surge temperature and maximum exhaust gas temperature control.

By simple adjustments of the potentiometers 36, 60 and 83, the fuel control system may be adapted to a wide range of operating conditions and/or various types of gas turbine engines.

In an alternative embodiment of the invention of FIG. 1 as shown in FIG. 8, the actual exhaust gas temperature signal appearing at the junction 43 is compared with the compressor surge temperature reference signal from the computer 35 in the algebraic summation device 40' to provide an error signal in accordance with the difference therebetween. The actual exhaust gas temperature signal is also compared with the maximum exhaust gas temperature reference signal from the means 36 in the algebraic summation device 40" to provide an error signal in accordance with the difference therebetween. The error signals from the summation devices 40' and 40" are connected to the minimum fuel command selector 27 shown in FIG. 1 along with the error signal from the device 26. As before, the error signal commanding the least fuel flow is selected and passed as a control signal to the amplifier 30. Although the embodiment of FIG. 8 requires an additional modulator and amplifier, in certain instances this arrangement may be desirable.

Referring now to FIG. 9, the present invention is applied to a gas turbine engine 10 having a gas generator comprising a compressor connected by a shaft 12 to a compressor turbine 13. The engine 10 further includes a power turbine 13' disposed downstream of the compressor turbine 13 and connected by a shaft 12' to a load not shown. The gas generator further includes fuel burners 15. The engine 10, for example, may be similar to the General Electric T58 wherein the power turbine 13' is connected by the shaft 12' to the rotor of a helicopter through reduction gearing. In this embodiment, the engine 10 is primarily controlled to maintain a desired power turbine speed which is established in accordance with the position of the power control lever 21.

The desired power turbine speed signal provided from the pick-off 22 associated with the lever 21 is compared in the device 25 with the actual power turbine speed signal from the power turbine tachometer generator 23 as connected by means of the frequency responsive circuit 24. The error signal which is the difference between the desired and actual power turbine signal is applied through the device 26 to the minimum fuel flow command selector 27 and operates in a manner similar to that described above with respect to FIG. 1.

To provide a signal representative of the compressor speed, a gas generator tachometer generator 23' is connected to be responsive to the rotation of the shaft 12 and provides a signal representative of the speed thereof to the frequency responsive circuit 24'. The signal from the circuit 24' is compared in an algebraic summation device 130 with a signal representative of the maximum gas generator speed reference signal as generated in a maximum generator speed reference signal providing means 131. The difference therebetween is an error signal which is applied to the selector 27. The gas generator error speed signal is also connected to be applied to the surge temperature computer 35 along with the signal representative of the compressor inlet temperature from the thermistor 34. The structure and operation of the surge temperature computer 35, the maximum exhaust gas temperature 36 and the comparison circuit 37 is the same as described above with respect to FIG. 1.

With the type of engine shown in FIG. 9, it is preferable to mount the thermocouple 41 between the compressor or gas generator turbine 13 and the power turbine 13' in order that it is responsive to the turbine outlet temperature. The signal from the thermocouple 41 is added at the junction 43 to the signal from the thermocouple lag compensation circuit 42 in order to provide a signal representative of the actual turbine outlet temperature in a manner similar to that described above. The reference signal on lead 50 is compared with the actual turbine outlet temperature signal in the device 40 and the difference therebetween is an error signal which is applied to the selector 27. The operation of the selector 27 and the control of the fuel flow to the burners 15 is the same as described above.

Additional stabilization of the power turbine speed servo loop may be provided by cross feeding the gas generator speed signal through a stabilizing netork 132, which may take the form of a frequency responsive circuit, into the algebraic summation device 25.

It will be obvious that the alternative embodiment shown in FIG. 8 may be readily adapted to the embodiment of the invention shown in FIG. 9.

Typical values of the electrical characteristics of the components of a system which has been constructed in accordance with the principles of the present invention and has proven satisfactory are shown in FIG. 2.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A control system for regulating the fuel supply to the fuel burners of a gas turbine and compressor combination comprising manually operable means for providing a signal representative of a desired engine speed, means responsive to the actual engine speed for providing a signal representative thereof, means responsive to said desired and actual engine speed signals for providing a first error signal in accordance with the difference therebetween, compressor surge temperature computing means responsive to engine conditions for providing a signal representative of the compressor surge temperature, maximum exhaust gas temperature reference means for providing a signal representative of a predetermined maximum exhaust gas temperature, comparison means responsive to said compressor surge temperature signal and said maximum exhaust gas temperature reference signal for providing a first reference signal in accordance with the lesser value thereof, means responsive to the actual exhaust gas temperature for providing a signal representative thereof which inherently lags changes in the actual exhaust gas temperature, fuel flow control valve means contoured in order that the log of the fuel flow is proportional to its stroke for controlling the flow of fuel to said fuel burners, means responsive to the position of said fuel flow control valve means for providing a signal representative of a function thereof in order that said fuel valve function signal provides compensation for the inherent lags in said exhaust gas temperature signal, means responsive to said lagged actual exhaust gas temperature signal and said fuel valve function signal for combining said signals to provide a synthesized signal accurately representative of the actual exhaust gas temperature, means responsive to said synthesized signal and said first reference signal for providing a second error signal in accordance with the difference therebetween, and minimum fuel flow command selecting means responsive to said first and second error signals for selecting the error signal commanding the least fuel flow for providing a control signal to said fuel flow control valve means in accordance therewith.

2. A control system for regulating the fuel supply to the fuel burners of a gas turbine and compressor combination comprising manually operable means for providing a signal representative of a desired engine speed, means responsive to the actual engine speed for providing a signal representative thereof, means responsive to said desired and actual engine speed signals for providing a first error signal in accordance with the difference therebetween, compressor surge temperature computing means responsive to engine conditions for providing a signal representative of the compressor surge temperature, maximum exhaust gas temperature reference means for providing a signal representative of a predetermined maximum exhaust gas temperature, comparison means responsive to said compressor surge temperature signal and said maximum exhaust gas temperature reference signal for providing a first reference signal in accordance with the lesser value thereof, thermocouple means responsive to the actual exhaust gas temperature for providing a signal representative thereof which inherently lags changes in the actual exhaust gas temperature, means including a fuel flow control valve contoured in order that the log of the fuel flow is proportional to its stroke for controlling the flow of fuel to said fuel burners, pick-off means responsive to the position of said fuel flow control valve for providing a signal in accordance therewith, high pass filter means responsive to said fuel valve signal for providing a rate signal in accordance with the rate of change thereof in order that said rate signal provides compensation for the inherent lags in said exhaust gas temperature signal, said high pass filter means being adapted to match the time constant of said thermocouple means, means responsive to said lagged actual exhaust gas temperature signal and said rate signal for combining said signals to provide a synthesized signal accurately representative of the actual exhaust gas temperature, means responsive to said synthesized signal and said first reference signal for providing a second error signal in accordance with the difference therebetween, and minimum fuel flow command selecting means responsive to said first and second error signals for selecting the error signal commanding the least fuel flow for providing a control signal to said fuel flow control valve means in accordance therewith.

3. In a fuel control system for a gas turbine engine having an adjustable fuel flow control valve, said fuel flow control valve being contoured in order that the log of the fuel flow is proportional to the stroke of said valve, thermal couple means responsive to the actual exhaust gas temperature of said engine for providing a signal substantially representative thereof, said thermocouple signal inherently lagging changes in the actual exhaust gas temperature, pick-off means responsive to the position of said fuel flow control valve for providing a signal in accordance therewith, high pass filter means responsive to said pick-off signal for providing a rate signal in accordance with the rate of change thereof, said high pass filter means having a time constant which provides a compensating signal that compensates for the lag in said thermocouple signal, and means for combining said thermocouple signal and said compensating signal to provide a synthesized signal representative of the actual exhaust gas temperature.

References Cited in the file of this patent
UNITED STATES PATENTS

| | | |
|---|---|---|
| 2,734,340 | Wood | Feb. 14, 1956 |
| 2,743,578 | Hazen | May 1, 1956 |
| 2,766,584 | Stockinger | Oct. 16, 1956 |
| 2,924,070 | Eastman | Feb. 9, 1960 |
| 2,945,478 | Hanna | July 19, 1960 |
| 2,971,337 | Wintrode | Feb. 14, 1961 |